(12) United States Patent
Hsieh

(10) Patent No.: US 9,185,513 B1
(45) Date of Patent: Nov. 10, 2015

(54) METHOD AND SYSTEM FOR COMPILATION WITH PROFILING FEEDBACK FROM CLIENT

(75) Inventor: Andrew Hsieh, Taipei (TW)

(73) Assignee: Google Inc., Mountain View, CA (US)

( * ) Notice: Subject to any disclaimer, the term of this patent is extended or adjusted under 35 U.S.C. 154(b) by 111 days.

(21) Appl. No.: 13/310,387

(22) Filed: Dec. 2, 2011

(51) Int. Cl.
*G06F 15/16* (2006.01)
*H04W 4/00* (2009.01)
*G06F 9/45* (2006.01)

(52) U.S. Cl.
CPC .............. *H04W 4/003* (2013.01); *G06F 8/443* (2013.01)

(58) Field of Classification Search
CPC ............ H04L 67/2804; H04L 67/2819; H04L 67/3823; H04W 4/003
USPC ......................................................... 709/203
See application file for complete search history.

(56) References Cited

U.S. PATENT DOCUMENTS

| | | | |
|---|---|---|---|
| 6,289,505 B1 * | 9/2001 | Goebel ......................... | 717/153 |
| 6,502,237 B1 * | 12/2002 | Yates et al. .................... | 717/136 |
| 6,606,660 B1 * | 8/2003 | Bowman-Amuah .......... | 709/227 |
| 6,779,107 B1 * | 8/2004 | Yates ............................ | 712/229 |
| 6,801,604 B2 * | 10/2004 | Maes et al. ................. | 379/88.17 |
| 6,934,832 B1 * | 8/2005 | Van Dyke et al. ............ | 712/244 |
| 7,054,402 B2 * | 5/2006 | Muellner ...................... | 375/355 |
| 7,069,421 B1 * | 6/2006 | Yates et al. .................... | 712/209 |
| 7,136,857 B2 * | 11/2006 | Chen et al. ............................ | 1/1 |
| 7,502,514 B2 * | 3/2009 | Gringeler et al. ............. | 382/232 |
| 7,685,183 B2 * | 3/2010 | Pace et al. ..................... | 707/610 |
| 7,779,091 B2 * | 8/2010 | Wilkinson et al. ............ | 709/220 |
| 7,853,643 B1 * | 12/2010 | Martinez et al. .............. | 709/203 |
| 7,941,647 B2 * | 5/2011 | Yates et al. .................... | 712/220 |
| 7,979,852 B2 * | 7/2011 | Bodin et al. ................... | 717/154 |
| 8,065,504 B2 * | 11/2011 | Yates et al. .................... | 712/209 |
| 8,127,121 B2 * | 2/2012 | Yates et al. .................... | 712/244 |
| 8,239,578 B2 * | 8/2012 | Denoual et al. ............... | 709/247 |
| 8,250,102 B2 * | 8/2012 | Madhavarapu et al. ...... | 707/792 |
| 8,266,290 B2 * | 9/2012 | Calder et al. .................. | 709/226 |
| 8,341,099 B2 * | 12/2012 | Khosravy ........................ | 706/12 |
| 8,527,337 B1 * | 9/2013 | Lim et al. ................... | 705/14.35 |
| 8,554,190 B2 * | 10/2013 | Smith et al. ................... | 455/418 |
| 2003/0018714 A1 * | 1/2003 | Mikhailov et al. ............ | 709/203 |
| 2006/0136571 A1 * | 6/2006 | Kloba et al. .................. | 709/217 |
| 2006/0143601 A1 * | 6/2006 | Concha et al. ................ | 717/170 |

(Continued)

OTHER PUBLICATIONS

Sehr, et al "Portable Native Client", Google, retrieved from http://www.llvm.org/devmtg/2010-11/Sehr-NativeClient.pdf, Nov. 4, 2010, 41 pages.

*Primary Examiner* — Kevin Bates
*Assistant Examiner* — Clarence D McCray
(74) *Attorney, Agent, or Firm* — Troutman Sanders, LLP; James E. Schutz; Christopher W. Glass

(57) ABSTRACT

A computer-implemented method for compilation of applications includes storing, at a server, a plurality of variants, wherein each of the plurality of variants describes a distinct client architecture. A plurality of optimized binaries for an application are maintained at the server, wherein the plurality of optimized binaries correspond to different variants in the plurality of variants. The server receives a request from a client to download the application, wherein the request includes a reference to a first variant that describes the client's architecture. A determination is made that the first variant corresponds to a first optimized binary of the plurality of optimized binaries, and the server provides the first optimized binary to the client.

24 Claims, 5 Drawing Sheets

(56) References Cited

U.S. PATENT DOCUMENTS

| | | | |
|---|---|---|---|
| 2008/0109532 A1* | 5/2008 | Denoual et al. | 709/219 |
| 2008/0127056 A1* | 5/2008 | Java et al. | 717/106 |
| 2008/0147787 A1* | 6/2008 | Wilkinson et al. | 709/203 |
| 2009/0234880 A1* | 9/2009 | Madhavarapu et al. | 707/103 R |
| 2009/0271784 A1* | 10/2009 | Barsness et al. | 718/1 |
| 2009/0276771 A1* | 11/2009 | Nickolov et al. | 717/177 |
| 2010/0235433 A1* | 9/2010 | Ansari et al. | 709/203 |
| 2010/0262619 A1* | 10/2010 | Zargahi et al. | 707/770 |
| 2011/0047540 A1* | 2/2011 | Williams et al. | 717/178 |
| 2011/0208786 A1* | 8/2011 | Ghosh et al. | 707/805 |
| 2011/0209045 A1* | 8/2011 | Ghosh et al. | 715/234 |
| 2011/0209049 A1* | 8/2011 | Ghosh et al. | 715/236 |
| 2012/0084393 A1* | 4/2012 | Williams et al. | 709/217 |
| 2012/0096070 A1* | 4/2012 | Bryzak | 709/203 |
| 2012/0106620 A1* | 5/2012 | Catania et al. | 375/240 |
| 2012/0220263 A1* | 8/2012 | Smith et al. | 455/410 |
| 2013/0138473 A1* | 5/2013 | Balko et al. | 705/7.27 |
| 2013/0139164 A1* | 5/2013 | Balko | 718/102 |
| 2013/0232229 A1* | 9/2013 | Firman et al. | 709/219 |
| 2014/0082050 A1* | 3/2014 | Chud et al. | 709/203 |

* cited by examiner

US 9,185,513 B1

METHOD AND SYSTEM FOR COMPILATION WITH PROFILING FEEDBACK FROM CLIENT

TECHNICAL FIELD

This disclosure generally relates to compilation of applications using profiling feedback from a client.

BACKGROUND

Client-side applications are often written in script languages (e.g., Javascript) or compiled into intermediate forms (e.g., bytecode) to run on a wide variety of client computing devices with different central processing unit (CPU) architectures, hardware accelerators, or platform libraries. An interpreter or compiler "just-in-time" (JIT) approach is used to execute the applications on the client computing device.

However, processing power, RAM, and storage capabilities of client computing devices are usually much less capable compared to desktop or server-side components. Even when power and storage capabilities of a client computing device are as capable as a server, battery power consumption of the computing device is a concern. As a result, client-side compilation of software is often light-weight and not as good as server-side compilation.

To cope with client computing devices that lack certain hardware accelerators or platform libraries, some applications may carry extra software libraries to emulate missing hardware or platform capabilities. The extra software, however, wastes bandwidth at download for clients that already have some or all of the software capabilities and thus do not need the extra software.

SUMMARY

According to one general aspect, a computer-implemented method for compilation of applications includes storing, at a server, a plurality of variants, wherein each of the plurality of variants describes a distinct client architecture. The method includes maintaining, at the server, a plurality of optimized binaries for an application, wherein the plurality of optimized binaries correspond to different variants in the plurality of variants. The method includes receiving, at the server, a request from a client to download the application, wherein the request includes a reference to a first variant that describes the client's architecture. The method includes determining that the first variant corresponds to a first optimized binary of the plurality of optimized binaries, and providing, from the server, the first optimized binary to the client.

In some implementations, the method also includes creating, at the server, the plurality of optimized binaries. Further, the method may include receiving, at the server, the plurality of variants. In various implementations, the first optimized binary is created after the request to download the application is received. Additionally, the request to download the application may be received via a digital marketplace. The method may also include receiving, at the server, profile information from the client upon approval by a user, and based on the profile information, automatically providing an updated optimized binary for the application to the user. The profile information may include usage patterns related to the application.

According to another general aspect, a system for optimizing applications includes a memory configured to store executable code, and a processor operably coupled to the memory. The processor may be configured to execute the code to receive, from a client, a request to download an application, wherein the request includes a reference to a variant that describes the client's architecture. Based on the request, the processor may be configured to create a binary file for the application, provide the binary file to the client, and upon receiving profile data from the client, create an optimized binary file for the application using the profile data.

In some implementations, the system is configured to automatically create the optimized binary file using the profile data. The binary file may be created based on the variant. The profile data may include instances of errors when the application is implemented. The instances of errors may be forwarded to a developer of the application.

According to yet another general aspect, a tangible computer-readable storage medium has recorded and stored thereon instructions that, when executed by a processor of a computer system cause the computer system to store a plurality of variants, wherein each of the plurality of variants describes a distinct client architecture, maintain a plurality of optimized binaries for an application, wherein the plurality of optimized binaries correspond to different variants in the plurality of variants, receive a request to download the application, wherein the request includes a reference to a first variant that describes a requesting client's architecture, determine that the first variant corresponds to a first optimized binary of the plurality of optimized binaries, and provide the first optimized binary to the requesting client. In some implementations, the system may receive profile information from the client upon approval by a user, and based on the profile information, automatically provide an updated optimized binary for the application to the user.

According to yet another general aspect, a system for compilation of applications includes a memory configured to store executable code and a plurality of variants, wherein each of the plurality of variants describes a distinct client architecture, and a processor operably coupled to the memory. The processor may be configured to execute the code to maintain a plurality of optimized binaries for an application, wherein the plurality of optimized binaries correspond to different variants in the plurality of variants, receive a request to download the application, wherein the request includes a reference to a first variant that describes a requesting client's architecture, determine that the first variant corresponds to a first optimized binary of the plurality of optimized binaries, and provide the first optimized binary to the requesting client.

In some implementations, the processor is further configured to execute the code to create the plurality of optimized binaries. The processor may be further configured to execute the code to receive the plurality of optimized variants. The optimized binary may be created after the request to download the application is received. The request to download the application may be received via a digital marketplace. The first variant may describe a configuration for a central processing unit architecture of the requesting client. The processor may be further configured to execute the code to receive profile information from the client upon approval by a user, and using the profile information, automatically provide an updated optimized binary to the user.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
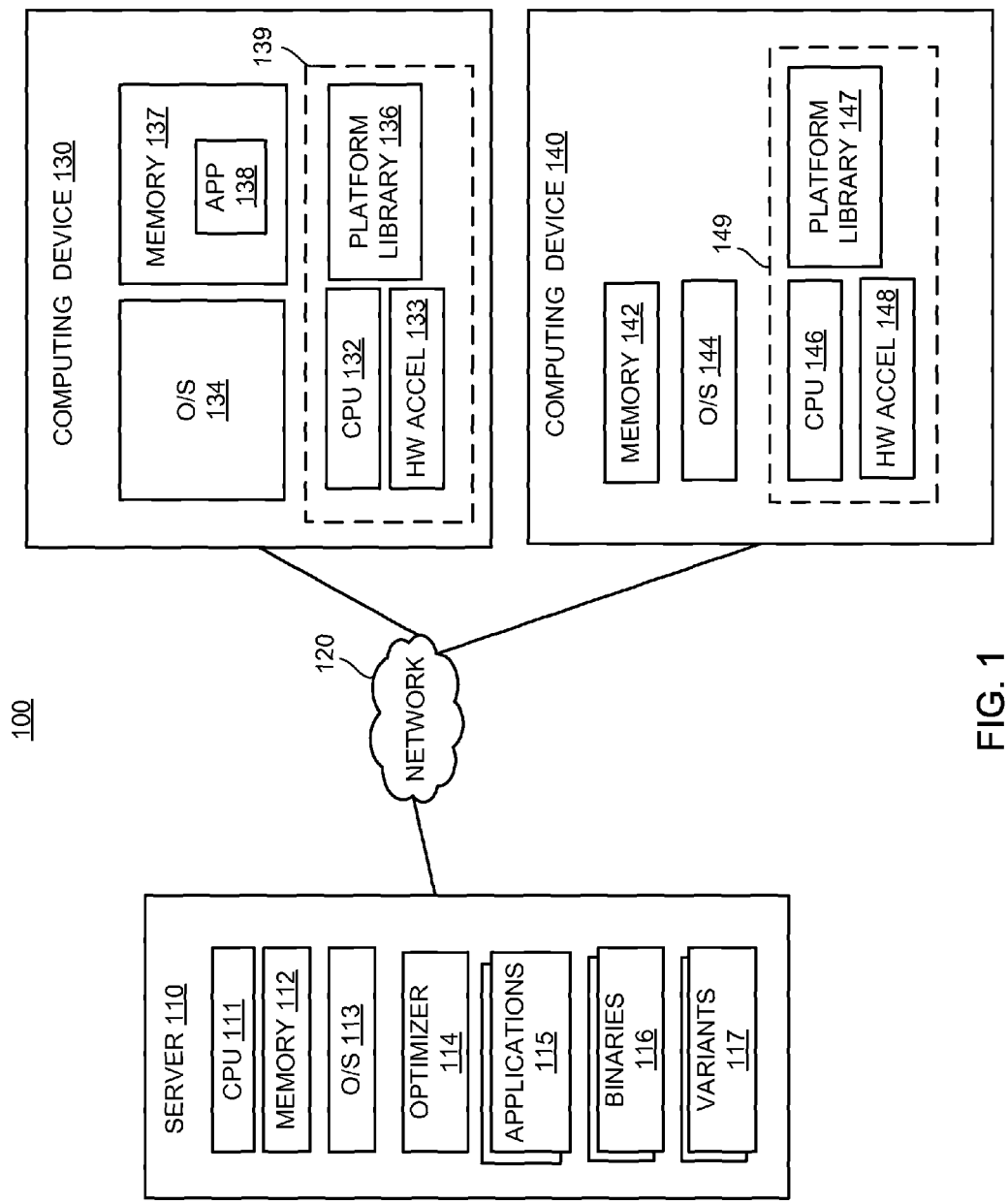
FIG. 1 illustrates an exemplary system for compilation of applications in accordance with the disclosed subject matter.

Some differences between computing devices cannot be altered using software. For example, a computing device's lack of a global positioning system (GPS) cannot be altered, although a location may still be approximated by using Wi-Fi and a cellphone tower. For those differences that can be altered by software, a developer of an application may choose to include its own software library when distributing the application, for example to address differences between old and new platforms or devices. A developer may provide his own compression library for platform application programming interface(s) (API) that are not originally supported by certain devices. For example, a developer may provide a digital audio software decoder (e.g., an MP3 software decoder) just in case certain devices do not have a digital audio hardware decoder. As another example, a developer may provide various software video encoders or decoders.

Differences in software and hardware capabilities for computing devices, such as CPU architecture, hardware accelerators, or platform libraries, are referred to as "variants" in this disclosure. A computing device's "variant" may also include any information or data about the computing device, including software or hardware associated with the computing device, such as peripheral devices. Client computing devices have the capability to publish their individual "variants" to servers, for example upon user approval when a user opts to download an application using a web browser.

A web browser executed by a client device can receive code (e.g., HTML code) from a remote server (e.g., a remote server that hosts a website) and can execute the received code on the client device for the benefit of a user of the client device.

In various implementations, the web browser may include or be associated with one or more web applications. In this context, a "web application" may be configured to perform a single task or multiple tasks for a user. In such an implementation, the web application may be configured to be executed or interpreted by the web browser. This is compared with native applications that include machine executable code and are configured to be executed directly by a processor or via the operating system of the client device, whereas a web application may be incapable of execution or display without the aid of the web browser. Thus, web applications can be run inside a browser with a dedicated user interface, and typically provide functionality and an experience that is more rich and interactive than a standalone website but less cumbersome and monolithic than a desktop application. Examples of web applications include games, photo editors, and video players that are run inside the browser.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks.

In various implementations, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike applications, there is little or no user interface component to the functionality provided by an extension. Instead, web extensions extend the functionality of the browser and the websites being viewed in it. For example, web extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page. Compared to web applications, extensions cut across websites and web applications. Extensions are usually in effect across all websites (though some are site-specific). Web applications do not combine with other applications in this way. Rather, web applications run standalone, like any regular website.

When installable web applications are "installed" by the user, the web applications may be added to and integrated with the user's web browser. Installation can include adding a shortcut to an application launcher area of the browser. An installation also allows web applications to obtain increased privileges without having to prompt the user for each one individually. Special user interface treatments may apply for the web application's tabs or windows. "Installing" a web application may include integration with: a client's operating system's task and window managers for easy window switching, a taskbar or quick-launch system, interoperating system notification(s), or persistently running background processes. Uninstallation allows for easy removal or deactivation of an installed application from the user's browser or system, and may include revoking all associated privileges. A server-side flag can be used to disable applications remotely.

FIG. 1 is a block diagram of a computing network 100 in accordance with an example embodiment. The network 100 may be used to implement compilation using the techniques described herein. The depiction of network 100 in FIG. 1 is shown by way of example. It will be appreciated that other network configurations may be used for implementing such techniques.

The network 100 includes server 110 and computing devices 130 and 140. The computing devices 130 and 140 may take the form of a number of different devices, such as a personal computer, laptop computer, tablet computer, netbook computer, or a web-enabled phone, as examples. Device 130 includes a CPU 132, hardware accelerator(s) (HW ACCEL) 133, an operating system (O/S) 134, a platform library 136, and a memory 137. CPU 132 may be any general processor, and O/S 134 may be one of many operating systems. Memory 137 may be one or more storage devices configured to store information used by CPU 132 to perform certain functions. For example, memory 137 may include app 138, which may be a web application related to photo editing, for example. Examples of hardware accelerators (HW ACCEL 133) include video cards or graphics cards, or any hardware built on top of field-programmable gate array chips, and may include any hardware that is used to perform some function faster than is possible in software running on a general CPU, such as CPU 132. It will be appreciated that in some embodiments, computing device 130 will not include any hardware accelerators.

Platform library 136 may include a collection of resources used to develop software, such as a Java class library or a C/C++ library. Variant 139 may include information about device 130's hardware architecture and platform libraries, such as information about CPU 132, HW ACCEL 133, and platform library 136, for example.

Device 140 includes a memory 142, an O/S 144, a CPU 142, which may be any general processor, platform library 147, and hardware accelerator(s) (HW ACCEL) 148. Platform library 147 may include a collection of resources used to develop software, such as a Java class library or a C/C++ library. Variant 149 may include information about device 140's hardware architecture and platform libraries, such as information about CPU 146, platform library 147, and HW ACCEL 148, for example.

In the network 100, the computing devices 130 and 140 are coupled with a network 120. The network 120 may include a data access network that provides access to the Internet and/or the World Wide Web. Via the network 120, computing devices 130 and 140 (using web browsers, for example) may communicate with a server 110. Server 110 includes a CPU 111, a memory 112, an O/S 113, an optimizer 114, applications 115, binaries 116, and variants 117. Optimizer 110 may compile code for each application in applications 115, and may generate a binary file for each application. Binary files ("binaries") 116 are computer files which may contain any type of data encoded in binary form for computer storage and processing purposes. A binary may be a completely functional program (e.g., a web application) capable of use by a computing device (e.g., devices 130 and 140) without any installer, for example.

In one implementation, the server 110 may be configured to receive requests from client computing devices (such as devices 130 and 140) for download of applications, and to provide, in response to such requests, binaries for the applications (e.g., for web applications or browser extensions).

The particular binary that is sent from server 110 to computing device 130 or 140 may depend on the "variant" of the requesting device (e.g., the hardware and software capabilities and architecture of computing device 130 or 140), as described in more detail below with respect to FIG. 2. Variants 117 may be stored in a storage location in server 110, or, in some implementations, variants 117 may be store remotely from server 110.

In the arrangement shown in FIG. 1, a browser may be used to request installation of applications 115 by interacting with the server 110. For instance, server 110 may implement a website that is used to distribute applications, such as web applications, among other content. As an example, the server 110 may implement an e-commerce site. The server 110 may acquire applications from developers, for example via network 120.

Requests to install applications may be included in messages from the computing devices 130, 140 to the server 110 that indicate agreement to purchase respective applications. In other implementations, the server 110 may take other forms or implement other techniques, such as providing access to free applications, or may take the form of a developer's website which provides access to application installation procedures/packages.

The specific actions performed when installing an application may vary depending on the particular implementation and/or the particular application. In an example implementation, installing a web application may include installing an icon that corresponds with the web application in an application launcher area of a web browser application. A user may then interact with this icon to launch the web application. In another example implementation, installing a web application may include syncing the web application across multiple computing devices (e.g., mobile phones, smart phones, tablets, laptops, desktops) that a user accesses, for example from different locations at different times (e.g., using the same login credentials).

In other implementations, installing a web application may include starting a background page for the web application, if the web application includes a background page feature. A background page of a web application may enable the web application to run as soon as the user logs into their computer, including before the user launches a web browser application or launches the associated web application in the web browser application. A background page may an invisible element running in a browser application, where the background page includes a declared association, in the web browser application, with the installed web application.

While network 100 illustrates only a single server 110, it will be appreciated that additional servers may be included in network 100.

Figure 2:
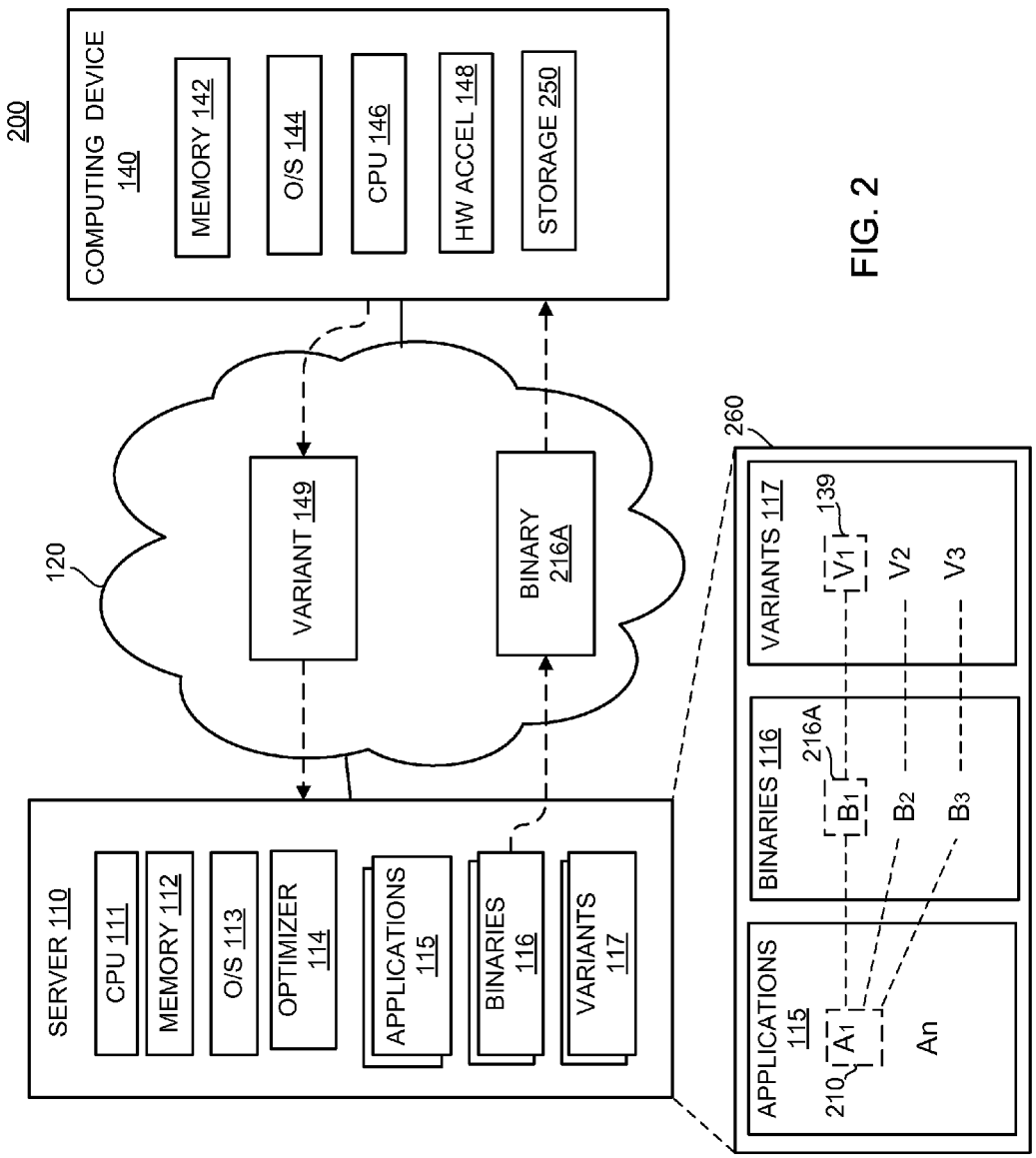
FIG. 2 is illustrates an exemplary system for compilation with profile feedback in accordance with the disclosed subject matter.

FIG. 2 illustrates exemplary system for compilation with profile feedback in accordance with the disclosed subject matter. As shown in FIG. 2, computing device 140 may request an application (e.g., application $A_1$ 210) from server 110, for example via a web browser. Before or after the request, computing device may also send or publish its variant 149 to server 110. In some implementations, server 110 may acquire variant 149 automatically with user authorization. Variant 149 may include information or data about computing device 140, including information about CPU 142 architecture, platform library 147, hardware accelerator(s) HW ACCEL 148, screen size, peripheral device(s), GPS, platform libraries, other software or hardware associated with computing device 140, or usage of particular applications, for example.

Server 110 may utilize the variant 149 to determine if a binary exists for application 210 that matches or relates to the received variant 149. For example, server 110 may use a data store 260 (e.g., table, database, etc.) that includes applications 115 (e.g., $A_1$, $A_n$, etc.), binaries 116 ($B_1$, $B_2$, $B_3$, etc.), and variants 117 ($V_1$, $V_2$, $V_3$, etc.) to determine which, if any, binary for application 210 corresponds to variant 149. In the example discussed above, the user of computing device 140 requests to download application "$A_1$" 210 from server 110, for example via a web browser. Computing device 140 may also send a reference to variant 149 that describes variant 149 to server 110 before, with, or after the request to download application "$A_1$" 210. Server 110 determines that application "$A_1$" 210 corresponds to several different binaries (e.g., any of binaries 116, such as binary "B$_1$" 216A, "B$_2$," and "B$_3$"). Server 110 also determines that variant 149 "V$_1$" corresponds to binary 216A "B$_1$". Upon determining that variant 149 corresponds to binary 216A, server 110 sends binary "B$_1$" 216A to computing device 140. Binary "B$_1$" 216A may be the binary that is optimized for device 140's architecture.

In some implementations, server 110 may only need to compile or optimize code once to generate a binary for each variant. The number of binaries 117 may grow over time, but the number of binaries 117 at server 110 is still fewer than having millions of clients each doing their own individual compilations.

In some implementations, optimizer 114 may compile code to generate a new binary for an application on-demand, i.e., when computing device 140 requests to download the application from server 110. Server 110 may determine that a binary for computing device 140's variant does not yet exist. In this example, the binary may be specialized for the particular client (e.g., computing device 140). Specialized binaries may save bandwidth on download, may take up less space in computing device's storage 250 (e.g., RAM/ROM), and may execute faster for certain computing devices. Server 110 sends the binary (e.g., binary 216A) to computing device 140. Computing device 140 may store binary 216A in storage 250, for example, and CPU 146 may use binary 216A to execute the requested application.

A debug symbol is information that expresses which programming-language constructs generated a specific piece of machine code in a given executable module. Sometimes the symbolic information is compiled together with the module's binary file, or distributed in separate file, or simply discarded during the compilation or linking. This symbolic information enables a person using a symbolic debugger to gain additional information about the binary, such as the names of variables and routines from the original source code. This information can be helpful while trying to investigate and fix a crashing application or any other error.

When debug symbols are embedded in the binary itself, the file can then grow significantly larger (sometimes by several megabytes). To avoid this extra size, some compilers and debugging systems output the symbolic information into a separate file.

In the implementation described above with respect to FIG. 2, server 110 may have all the details for symbolic information for debugging available because server 110 performs the whole compilation for an application, unlike a JIT compiler running on a client, which either has to store its own symbolic information during compilation (which takes up a lot of storage) or lack the symbolic information (making debugging difficult). Symbolic information is usually much larger than a binary, and it saves space on a client device if server 110 stores the symbolic information.

Information (e.g., variant 149, or usage information related to the application) that is provided by computing device 140 to the server 110 may be provided on an opt-in basis. In other words, such information may be provided from the computing device 140 to the server 110 only if a user of the computing device specifically authorizes the transmission of such information from the computing device to the server. Further, in some implementations, application updates may be reported to users that have opted to receive such information, such as to a user who opted to receive updates (e.g., when the user downloaded an application). In addition, data may be anonymized in one or more ways before it is sent, so that personally identifiable information is removed.

Figure 3:
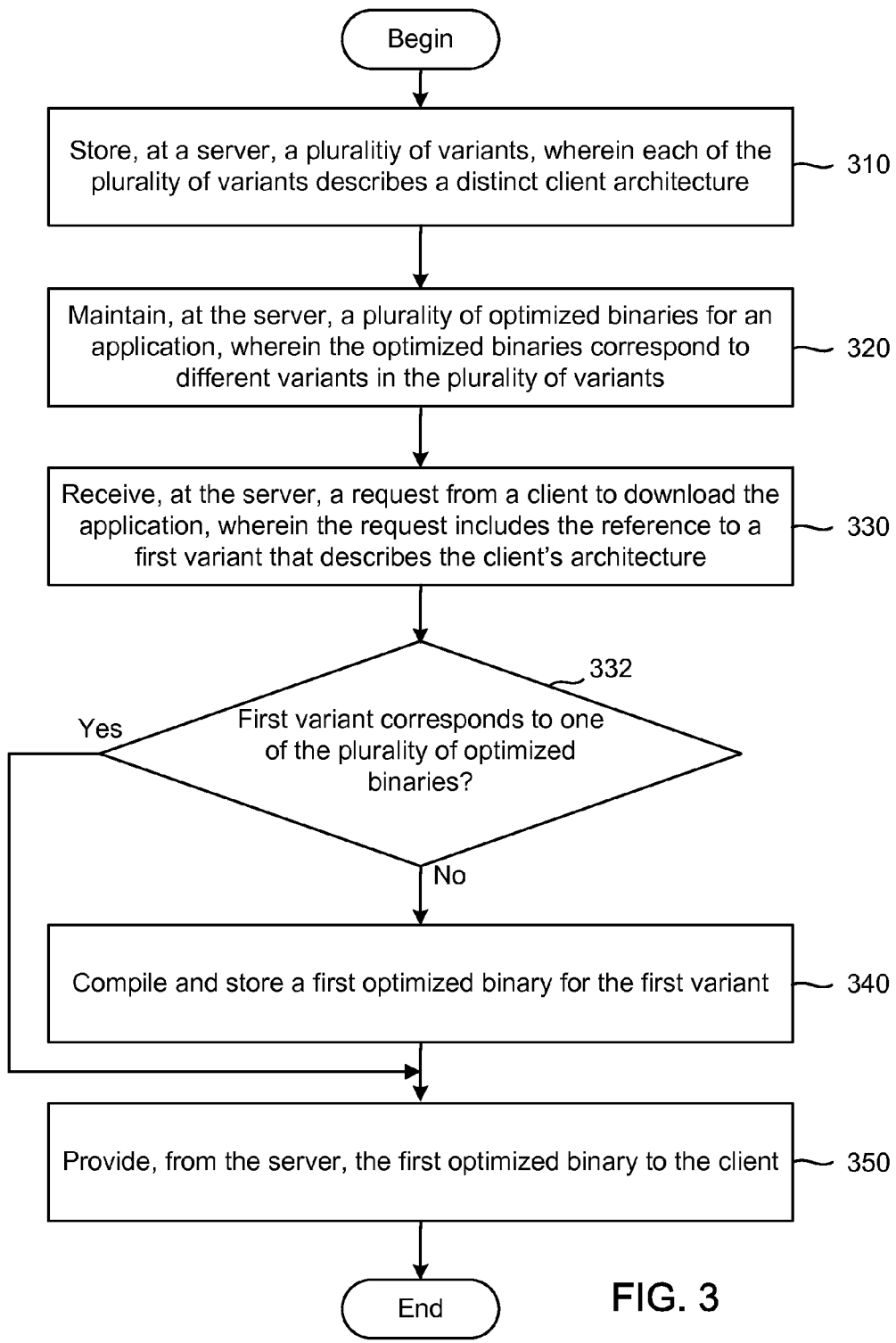
FIG. 3 illustrates a flowchart of an exemplary process for compilation of applications.

FIG. 3 is a flowchart of a process for an exemplary process for compilation of applications. The flowchart shown in FIG. 3 may be performed at least in part by a server (e.g., server 110 shown in FIGS. 1 and 2). A plurality (e.g., a list, table, data structure, etc.) of variants is stored at a server (310). Each variant may correspond to a distinct client architecture (e.g., variant 149 described above with respect to in FIG. 2). Alternatively or additionally, each variant may correspond to a set of clients with similar characteristics, such as CPU architectures, hardware accelerators, peripherals, or platform libraries, for example.

A plurality of optimized binaries (e.g., binaries 116 shown in FIGS. 1 and 2) are maintained at the server for an application (320). The optimized binaries may correspond to different variants or different sets of variants in the plurality of variants. For example, one of the optimized binaries may be a re-compiled application that is specialized to enhance a user's experience based on a particular CPU architecture.

The server receives a request (e.g., from computing device 140 shown in FIG. 1) to download the application (330). The request may include a reference to a first variant (e.g., variant 149 described above with respect to FIG. 2) that describes a client's architecture (e.g., computing device 140). A determination is made whether the first variant corresponds to one of the plurality of optimized binaries (332). For example, as shown in FIG. 2, optimizer 114 may determine that variant "V$_1$" 139 corresponds to a first optimized binary "B$_1$" 216A, from binaries 116.

If not (330, no), server 110 may compile and store a first optimized binary for the first variant (340). If the variant corresponds to one of the optimized binaries (e.g., a first optimized binary) (330, yes), or after compiling and storing the first optimized binary (340), the server provides the first optimized binary to the client (350), for example via network 120 shown in FIGS. 1 and 2.

To optimize applications, developers may need to understand how the applications are actually used (i.e., "usage patterns"). Not all computing devices are the same, and a developer cannot necessarily predict all differences or each user's usage pattern for an application. A user may download a generic version of an application, which may be subsequently optimized, for example based on the user's usage pattern. Some or all of the process shown in FIG. 4 may be performed automatically, with user approval. For example, a user may authorize automatic application updates when a user downloads an application from a digital marketplace.

A developer may write in a script language or compile code into intermediate forms (e.g., bytecode). To target different variants, a developer does not need to generate native binary code. For example, writing applications in Javascript or Java is sufficient. In some implementations, developers may use portable solutions. For example, portability means that a web page renders and behaves the same way, regardless of the browser's operating system or the type of hardware it is running on. In some implementations, a developer can build and run binaries for a variety of processor architectures, and can create a portable representation of the binaries. A browser running on any type of processor could translate the portable representation into a native binary without access to the source code of the program.

Figure 4:
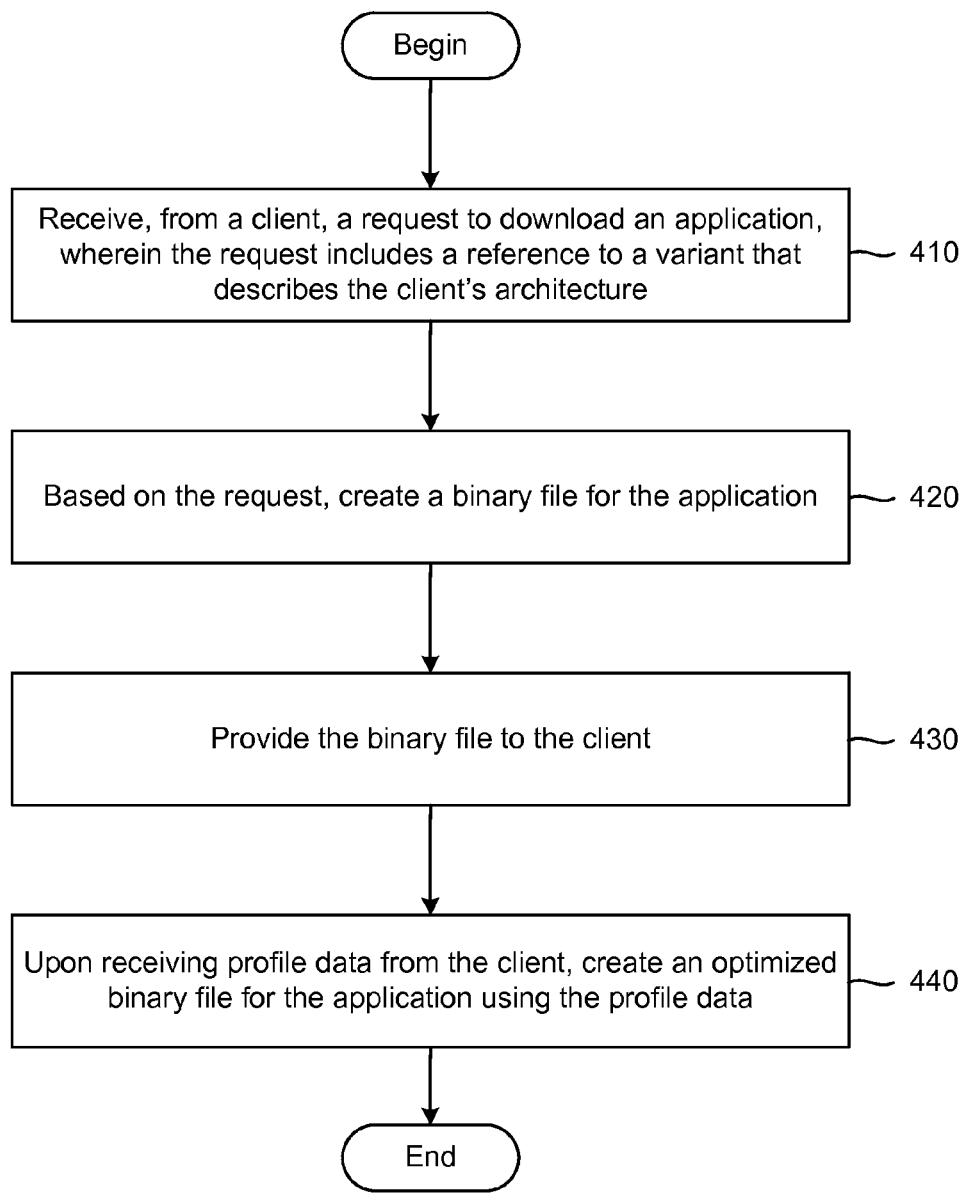
FIG. 4 is a flowchart of an exemplary process for optimizing applications.

The developer may submit the application to a digital marketplace (e.g., server 110 shown in FIG. 1), from which a user may download the application. In one exemplary implementation, a server may optimize the application for a user (e.g., a particular user or a typical anticipated user), for example based on usage patterns. FIG. 4 is a flowchart of an exemplary process for optimizing applications. The flowchart shown in FIG. 4 may be performed at least in part by a server (e.g., server 110 shown in FIG. 1). The system receives, from a client (e.g., computing device 130 shown in FIG. 1) a request to download an application, wherein the request includes a reference to a variant that describes the client's architecture. The request includes a variant. (410). The reference to the variant may include data about the computing device's CPU architecture, hardware accelerators, or platform library, for example (e.g., variant 149 shown in FIG. 1). Based on the request, the system creates a binary file for the application (420). The system provides the binary file to the client (430).

A client (e.g., computing device 130) may collect profile data while implementing the application. As an example, profile data may include data about how a video editing application is used on the computing device. The data may be collected in the background while the video editing application is implemented at the computing device.

Upon receiving profile data from the client (e.g., usage patterns or other information related to use of the application), the system creates an optimized binary file for the application using the profile data (440). In some implementations, the optimized binary file may be sent to the user immediately or shortly after submitting the profile data, or at a later time as a regular application update. In the example mentioned above, if a user implements some function of the video editing application more frequently than other functions, the frequently used function may be optimized to run 10-20% faster, for example, to cut down on latency. In this example, the rest of the video editing application may be left un-optimized, and the video editing application's overall performance is therefore enhanced for the particular user of the computing device.

In some implementations, profile data may be collected at various levels. At a function level, a compiler can instrument each function of an application (i.e., insert code at the prologue of function) to count how many times the function is executed. A larger counter indicates the popularity of that function (or worthiness of re-compilation or optimization). At another level, a function may consist of at least one "basic block" (i.e., a single-entrance, single-exit, stream of instruction in compiler terms) and edges (i.e., potential execution paths) between basic blocks. Basic blocks and edges form a "control-flow-graph" (CFG). A compiler can insert code in each basic block to count how many times each block is executed. The compiler can than re-optimize to favor a frequently executed "hot" path in the CFG.

Instrumentation at a basic block level can significantly bloat the code size, however, and can also skew the run-time performance. Another alternative is to perform sampling-based profiling where operating systems sample instruction pointer(s) ("IP") at a pre-determined time interval. The compiler can map the IP back to the source line of a program (much like a debugger can map IP back to source lines) and figure out the "hot" path of the CFG. Assigning a counter for each instruction address is expensive, so in some implementations, adjacent IP (e.g., a group of 16) may share the same counter.

Profile data collection may also be subject to the how representable the training inputs are with respect to typical use, and a user's behavior or use of an application can also change overtime. In some implementations, a threshold to trigger re-compilation, or to trigger when profile data is sent to server 110, may exist, for example to avoid a recompilation "ping-pong" between two popular uses of an application too often. In some implementations, server 110 may provide two different optimized versions of the application to a user, for example to address two popular uses of the application.

In some implementations, differences in usage can become an additional dimension of a variant. Server 110 can group similar sets of usage together, to reduce the number of variants due to different types of usage. For example, in some implementations, server 110 may find a binary among the binaries 116 that best matches a variant, for example a binary with usage similar to usage by a particular computing device. In some implementations, server 110 may locate several binaries that match a variant. In those implementations, the first binary that server 110 locates as matching a variant may not be the best binary after server 110 considers usage patterns. Server 110 may locate the best binary, based on usage patterns, among the subset of binaries that matches the variant.

In some implementations, if a computing device or a user can not provide profile data, or if a user opts not to provide certain data, a server may deliver its best guess for an optimized binary, for example based on aggregated data (e.g., geographic data, language data, social graph data, etc.).

In some implementations, if an application crashes, the computing device may collect a "core dump" (e.g., a memory or storage dump that records the state of the working memory of a computer program at a specific time) for the server, and the server may match up the "core dump" data with symbolic information stored at the server. Server 110 may send the information to a developer of the application to assist in debugging.

Figure 5:
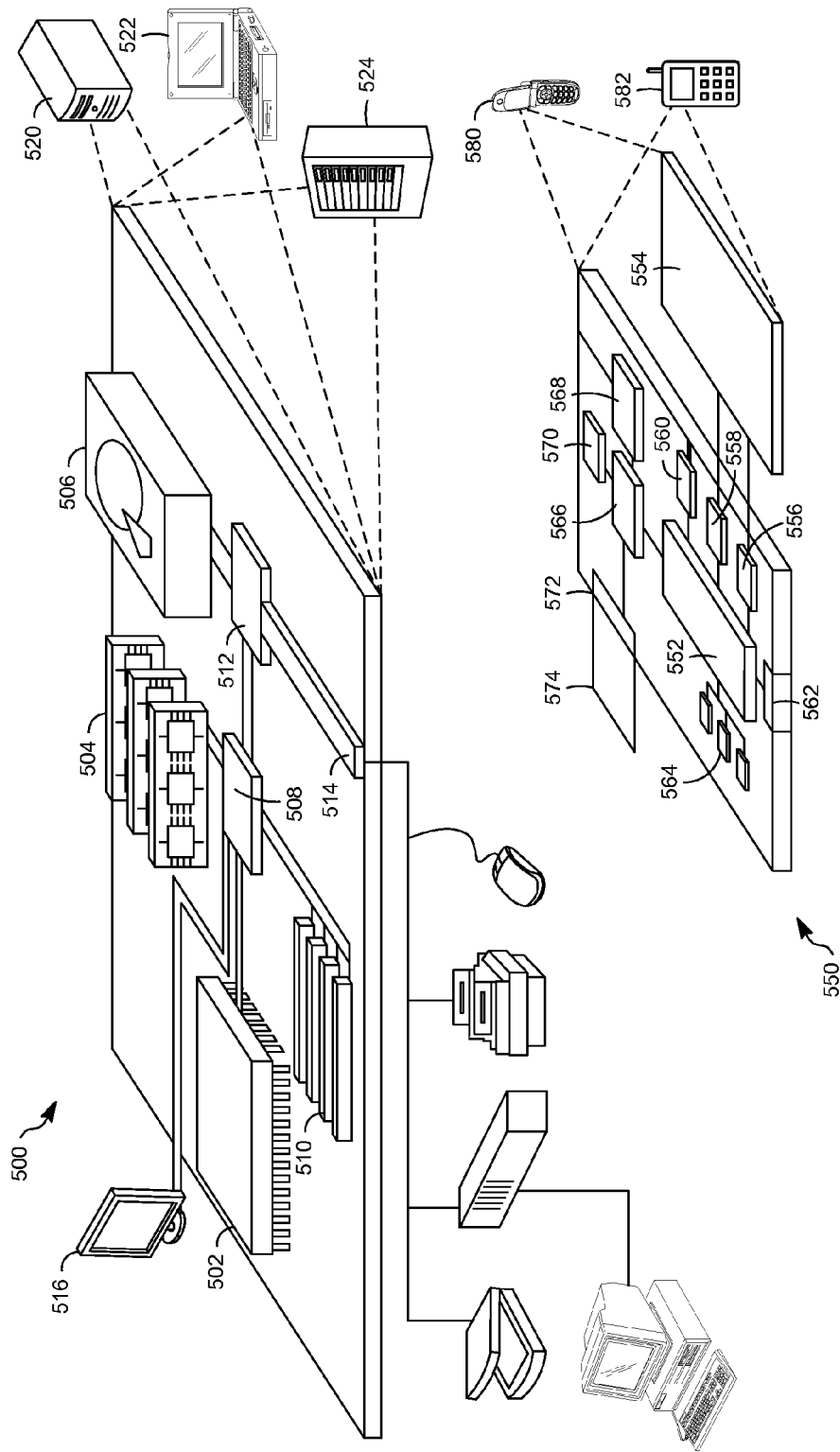
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations and embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations and embodiments are within the scope of the following claims.

What is claimed is:

1. A method, comprising:
storing, at a server, a plurality of variants, wherein each variant of the plurality of variants describes at least one of a hardware architecture and platform library;
receiving, at the server, an indication of a usage pattern of a particular function performed by a particular application on a client device;
receiving, at the server, a request from the client device to download a binary software application, the request including a reference to a first variant of the plurality of variants, wherein the first variant identifies at least one of a first hardware architecture and a first platform library associated with the client device;
responsive to receiving the request from the client device, creating the binary software application corresponding to the first variant and the usage pattern, the creating comprising compiling source code to generate the binary software application; and
providing, from the server, the created binary software application to the client device.

2. The method of claim 1, further comprising:
receiving, at the server, the plurality of variants.

3. The method of claim 1, wherein the binary software application is created after the request to download the binary software application is received.

4. The method of claim 1, wherein the request to download the binary software application is received via a digital marketplace.

5. The method of claim 1, further comprising:
receiving, at the server, profile information from the client device upon approval by a user; and
based on the profile information, automatically providing an updated binary software application to the user.

6. The method of claim 5, wherein the profile information includes usage patterns related to the binary software application, the usage patterns indicating a frequency of use of a particular function performed by the binary software application.

7. A system, comprising:
a processor; and
a memory coupled to the processor, configured to store executable code that, when executed by the processor, causes the system to:
receive an indication of a usage pattern of a particular function performed by a particular application on a client device;
receive, from the client device, a request to download a binary software application, wherein the request includes a reference to a variant that describes at least one of a hardware architecture and platform library associated with the client device;
responsive to receiving the request from the client device, create a first binary software application that corresponds to the variant and the usage pattern, the creating comprising compiling source code for the first binary software application;
provide the created first binary software application to the client device; and
upon receiving profile data from the client device, create a second binary software application using the profile data.

8. The system of claim 7, wherein creating the second binary software application using the profile data comprises automatically creating the second binary software application upon receiving the profile data from the client device.

9. The system of claim 7, wherein the profile data includes instances of errors associated with implementing the first binary software application.

10. The system of claim 9, wherein the executable code, when executed by the processor, further causes the system to forward the instances of errors to a developer of the second binary software application.

11. A non-transitory computer-readable storage medium having stored thereon instructions that, when executed by a processor of a computer system, cause the computer system to:
   store a plurality of variants, wherein each variant of the plurality of variants describes at least one of a hardware architecture and platform library;
   receive an indication of a usage pattern of a particular function performed by a particular application on a client device;
   receive a request from the client device to download a binary software application, the request including a reference to a first variant of the plurality of variants, wherein the first variant identifies at least one of a first hardware architecture and a first platform library associated with the client device;
   responsive to receiving the request from the client device, create a binary software application corresponding to the first variant and the usage pattern, the creating comprising compiling source code to generate the binary software application; and
   provide the created binary software application to the client device.

12. The non-transitory computer-readable storage medium of claim 11, wherein the instructions, when executed by the processor, further cause the computer system to:
   receive the plurality of variants.

13. The non-transitory computer-readable storage medium of claim 11, wherein the binary software application is created after the request to download the application is received.

14. The non-transitory computer-readable storage medium of claim 11, wherein the request to download the binary software application is received via a digital marketplace.

15. The non-transitory computer-readable storage medium of claim 11, wherein the instructions, when executed by the processor, further cause the computer system to:
   receive profile information from the client device upon approval by a user; and
   based on the profile information, automatically provide an updated binary software application to the user.

16. The non-transitory computer-readable storage medium of claim 11, wherein the profile information includes usage patterns related to the binary software application, the usage patterns indicating a frequency of use of a particular function performed by the binary software application.

17. A system, comprising:
   a processor;
   a memory coupled to the processor, configured to store executable code and a plurality of variants, wherein each of the plurality of variants describes at least one of a hardware architecture and platform library, and wherein the executable code, when executed by the processor, causes a computer system to:
   receive an indication of a usage pattern of a particular function performed by a particular application on a client device;
   receive a request from the client device to download a binary software application, the request including a reference to a first variant of the plurality of variants, wherein the first variant identifies at least one of a first hardware architecture and a first platform library associated with the client device;
   responsive to receiving the request from the client device, create a binary software application corresponding to the first variant, the creating comprising compiling source code for the binary software application; and
   provide the created binary software application to the client device.

18. The system of claim 17, wherein the instructions, when executed by the processor, further cause the computer system to:
   receive the plurality of variants.

19. The system of claim 17, wherein the binary software application is created after the request to download the binary software application is received.

20. The system of claim 17, wherein the request to download the binary software application is received via a digital marketplace.

21. The system of claim 17, wherein the first variant describes a configuration for a central processing unit architecture of the client device.

22. The system of claim 17, wherein the instructions, when executed by the processor, further cause the computer system to:
   receive profile information from the client device upon approval by a user; and
   using the profile information, automatically provide an updated binary software application to the user.

23. The method of claim 1, wherein the first variant indicates at least one of hardware accelerators and peripheral devices associated with the client device.

24. The method of claim 1, wherein the usage pattern indicates a pattern of use of the particular function by a user of the client device.

* * * * *